(12) United States Patent
Ichikawa

(10) Patent No.: US 7,201,314 B2
(45) Date of Patent: Apr. 10, 2007

(54) SETTLEMENT TERMINAL

(75) Inventor: Takashi Ichikawa, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 393 days.

(21) Appl. No.: 10/936,107

(22) Filed: Sep. 8, 2004

(65) Prior Publication Data

US 2005/0161504 A1 Jul. 28, 2005

(30) Foreign Application Priority Data

Jan. 28, 2004 (JP) ............... 2004-019563

(51) Int. Cl.
*G06K 5/00* (2006.01)
*G06K 15/00* (2006.01)
(52) U.S. Cl. ............ 235/380; 235/383; 235/439; 902/22
(58) Field of Classification Search ............ 235/383, 235/439, 449, 435; 902/22, 38, 40; 705/16, 705/17, 41
See application file for complete search history.

(56) References Cited

U.S. PATENT DOCUMENTS

| | | | | |
|---|---|---|---|---|
| 5,302,811 A | * | 4/1994 | Fukatsu ............ | 235/380 |
| 5,408,078 A | * | 4/1995 | Campo et al. ........ | 235/380 |
| 5,489,773 A | * | 2/1996 | Kumar ............ | 235/380 |
| 5,756,978 A | * | 5/1998 | Soltesz et al. ........ | 235/380 |
| 6,073,838 A | * | 6/2000 | Baitz et al. .......... | 235/380 |
| 6,895,419 B1 | * | 5/2005 | Cargin et al. ........ | 235/375 |
| 6,991,159 B2 | * | 1/2006 | Zenou .............. | 235/383 |
| 2003/0222142 A1 | * | 12/2003 | Stevens ............ | 235/385 |

FOREIGN PATENT DOCUMENTS

| | | |
|---|---|---|
| JP | 7-501903 A | 2/1995 |
| JP | 10-134255 A | 5/1998 |
| JP | 2000-250970 A | 9/2000 |
| JP | 2002-133371 A | 5/2002 |
| JP | 2003-091776 A | 3/2003 |
| WO | WO 93/06564 A1 | 4/1993 |

\* cited by examiner

*Primary Examiner*—Jared J. Fureman
(74) *Attorney, Agent, or Firm*—Frishauf, Holtz, Goodman & Chick, P.C.

(57) ABSTRACT

A keyboard is disposed on a front side of an upper surface of a housing and a display unit is disposed on a rear side of the housing upper surface. The housing houses therein a printer mechanics unit at a position just under the keyboard. The housing houses therein a control board on a back side of the display unit, the control board carrying a microcomputer thereon. The housing further houses therein a roll paper receptacle portion at a position just under the display unit and the control board, the roll paper receptacle portion accommodating removablely roll paper to be fed to the printer mechanics unit. According to this construction, the housing is not required to extend backward to ensure a mounting space for the roll paper receptacle portion, that is, the size of the device is reduced.

9 Claims, 5 Drawing Sheets

SETTLEMENT TERMINAL

CROSS REFERENCE TO RELATED APPLICATION

The present application is based on Japanese Priority Document P2004-19563 filed on Jan. 28, 2004, the content of which is incorporated herein by reference.

BACKGROUND OF THE INVENTION

1. Field of the Invention

The present invention relates to a settlement terminal for executing settlement processing on the basis of settlement information acquired.

2. Discussion of the Background

Heretofore, settlement terminals have spread widely, typical of which is a CAT (Credit Authorization Terminal). The CAT reads magnetic information recorded on a credit card and executes settlement processing on the basis of the read magnetic information. With the development of various media capable of settlement, including IC cards and debit cards, such settlement terminals have come to be able to accept settlement processing using other media capable of settlement than credit cards.

According to the structure of a typical conventional settlement terminal, as described in Japanese Published Unexamined Patent Application No. 2002-133371, the settlement terminal is positioned on the upper surface of a housing, a keyboard and a display unit are disposed on front and rear sides, respectively, and a card reading groove for scanning a magnetic card is formed adjacent to the keyboard and the display unit. A printer mechanics unit is installed within the housing and settlement slips are printed and issued by the printer mechanics unit.

If conventional settlement terminals are constructed so as to accommodate printing paper (roll paper) for settlement slips therein, roll paper is in many cases disposed within the rear portion of the housing as in the settlement terminal described in the foregoing publication 2002-133371. This is apt to result in the appearance layout of a settlement terminal such that a keyboard, a display unit, and a roll paper receptacle portion, are arranged from the front to the back side. If such an appearance layout is adopted, the housing is compelled to extend backward due to the roll paper receptacle portion, thus giving rise to the problem that the entire device becomes larger in size.

SUMMARY OF THE INVENTION

Accordingly, it is an object of the present invention to attain the reduction in size of the device.

The object of the present invention is achieved by the novel settlement terminal of the present invention.

According to the novel settlement terminal of the present invention, a keyboard is disposed on the front side of an the upper surface of a housing, a display unit is disposed on a rear side of the upper surface of the housing, a printer mechanics unit is disposed within the housing at a position just under the keyboard, a control board carrying a microcomputer is disposed within the housing on a back side of the display unit, and a roll paper receptacle portion, which receives therein removable roll paper to be fed to the printer mechanics unit, is disposed within the housing at a position just under the display unit and the control board.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention is described hereinunder with reference to the accompanying drawings. A settlement terminal of this embodiment is for use in settlement using a card that functions as a substitute for cash, such as a cash card used as a credit card or a debit card.

Figure 1:
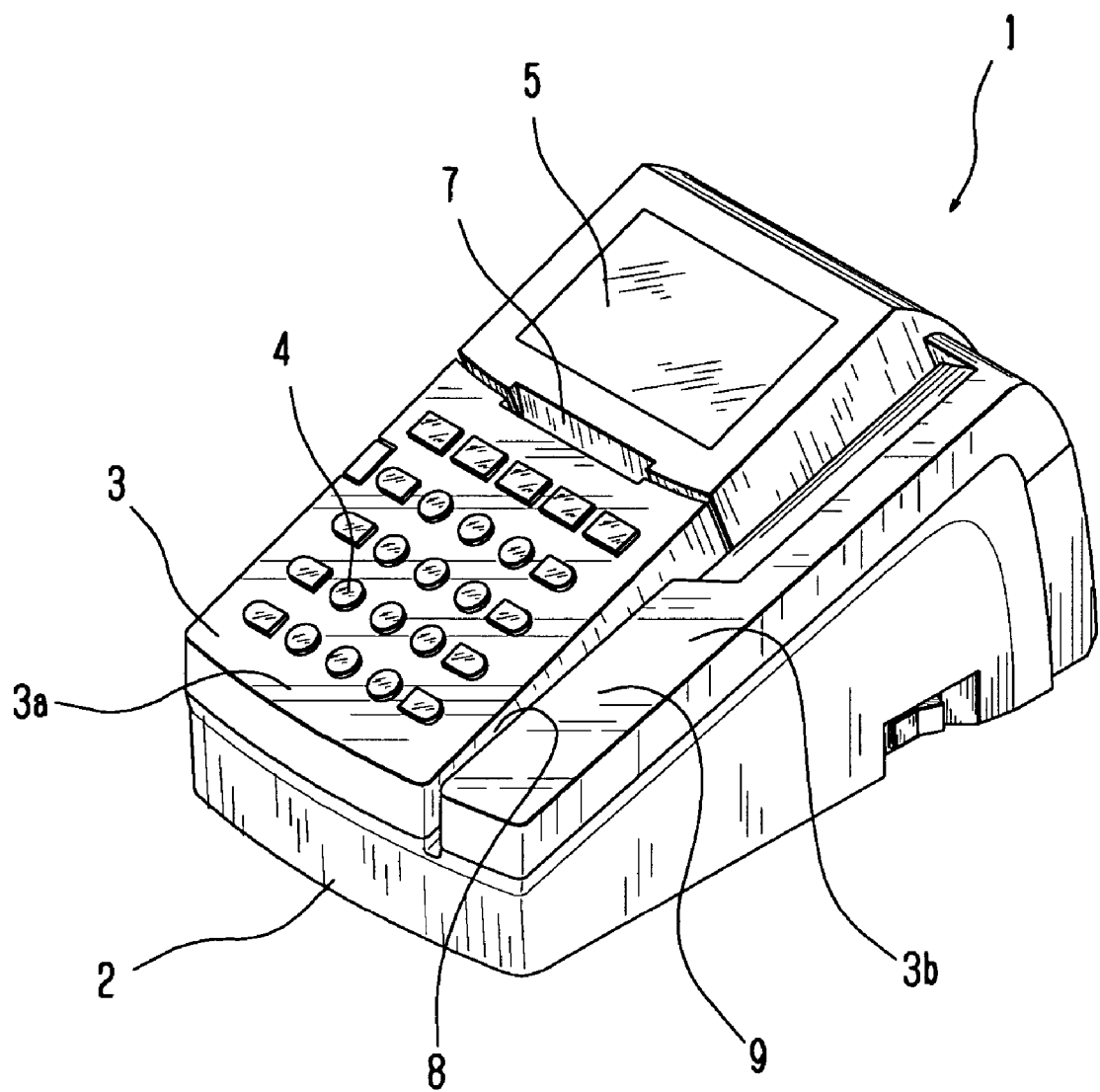
FIG. 1 is a perspective view showing schematically an appearance of a settlement terminal according to an embodiment of the present invention.
Figure 2:
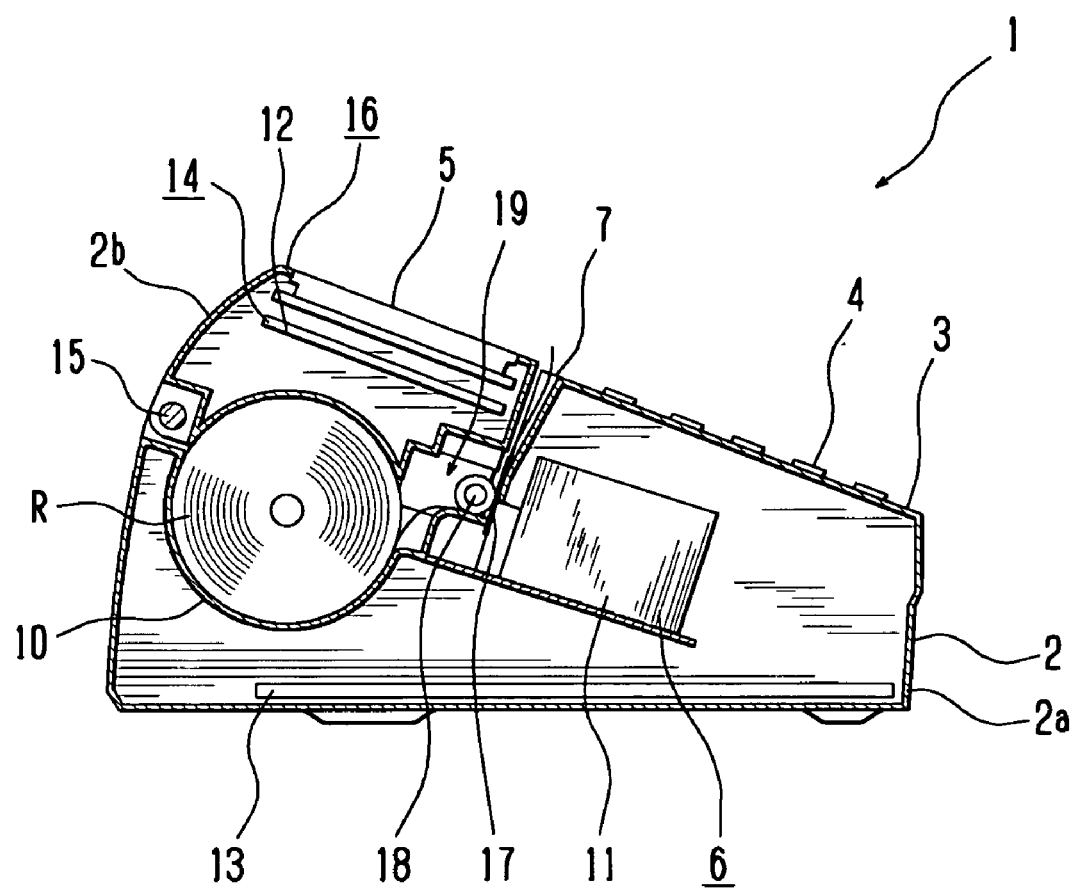
FIG. 2 is a longitudinal sectional view of the settlement terminal.
Figure 3:
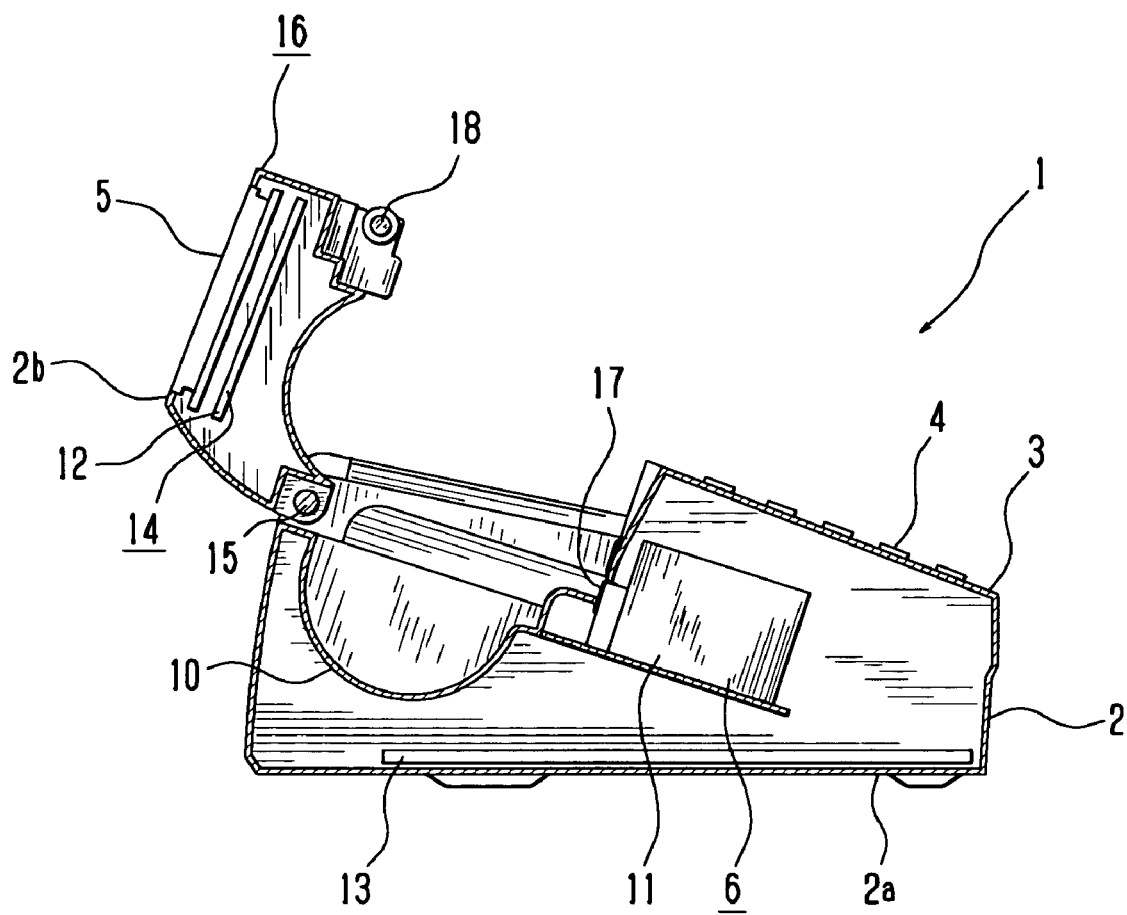
FIG. 3 is a longitudinal sectional view showing schematically the settlement terminal in an open condition of an opening/closing unit.

FIG. 1 is a perspective view showing schematically the appearance of the settlement terminal of this embodiment. FIG. 2 is a longitudinal sectional view thereof. FIG. 3 is a longitudinal sectional view showing schematically the settlement terminal in the open condition of an opening/closing unit.

As shown in FIG. 1, a keyboard 4 comprising various keys and a thin, flat display unit 5 for the display of transaction contents, operation guide, etc., the display unit 5 having an LCD (Liquid Crystal Display), are disposed in this order from a front side (operator side) toward a rear side of a settlement terminal 1 of this embodiment on an upper surface 3 of a housing 2 of the settlement terminal. An issue port 7 for issuing settlement slips, which are printed by a printer 6 (see FIG. 2) installed within the housing 2, is formed in the upper surface 3 of the housing 2 at a position between the keyboard 4 and the display unit 5.

A magnetic card reader portion 9 is provided at a right end portion of the housing 2. The magnetic card reader portion 9 is provided on the upper surface 3 side of the housing 2 with a slit-like card reading groove 8 for scanning a magnetic card. The card reading groove 8 is positioned on the right side of the keyboard 4 and the display unit 5 and is formed in a shape that permits a magnetic stripe side of a credit card to be inserted therein and drawn out to the front side (operator side). A magnetic card reader 9a (see FIG. 4) for reading information stored in the magnetic stripe of the magnetic card when scanned through the card reading groove 8 is disposed within the magnetic card reader portion 9.

The card information stored in the magnetic stripe of the magnetic card is, in the case of a credit card, a credit card number as information inherent in the card, or in the case of a cash card, it is an account number as information inherent in the card.

The upper surface 3a of the housing 2 with the keyboard 4, issue port 7 and display unit 5 disposed thereon, and the upper surface 3b of the magnetic card reader portion 9, are inclined toward the front side. That is, the upper surfaces 3a and 3b are descending slopes descending from the rear side toward the front side. A magnetic card draw-out angle in the card reading groove 8 is set at the same angle as the angle of inclination of the upper surface 3b of the magnetic card reader portion 9. The angle of inclination of the upper surface 3a of the housing 2 with the keyboard 4, issue port 7 and display unit 5 disposed thereon is about 18 degrees, while the angle of inclination of the upper surface 3b of the magnetic card reader portion 9 is set at about 14 degrees. Thus, the angle of inclination of the upper surface 3a of the housing 2 with the keyboard 4, issue port 7 and display unit 5 disposed thereon is set larger than the angle of inclination of the upper surface 3b of the magnetic card reader 9a.

As shown in FIG. 2, a throw-in type roll paper receptacle portion 10 that accommodates roll paper R therein, a printer 6 having a printer mechanics unit 11 for drawing out and printing the roll paper R accommodated in the roll paper receptacle portion 10, and a control board 14 which controls various components of the settlement terminal 1 and comprises a first control board 12 and a second control board 13, are disposed in the interior of the housing 2. The roll paper R is a roll of long paper. The first control board 12 is disposed on the back side of the display unit 5 and the second control board 13 is disposed on the bottom of the housing 2. The roll paper receptacle portion 10 is disposed just under the display unit 5 and the first control board 12. Furthermore, the printer mechanics unit 11 is disposed in front of the roll paper receptacle portion 10 and just under the keyboard 4.

As shown in FIGS. 2 and 3, the housing 2 is comprised of a housing body portion 2a that supports the keyboard 4, the printer 6 and the second control board 13, and a housing opening/closing portion that supports the display unit 5 and the first control board 12. The housing opening/closing portion 2b is provided pivotably with respect to the housing body portion 2a around a hinge shaft 15, which is a fulcrum provided on the rear side of the housing body portion 2a. The housing opening/closing portion 2b constitutes an opening/closing unit 16 together with the display unit 5 and the first control board 12. That is, the opening/closing unit 16 is pivotable with respect to the housing body portion 2a around the shaft 15. As is described later, part of the printer 6 is attached to the housing opening/closing portion 2b.

The following description is now provided regarding the printer 6. The roll paper receptacle portion 10 is formed in a semi-cylindrical shape having an open upper surface for accommodating and holding roll paper R removably. The roll paper receptacle portion 10 used in this embodiment receives the roll paper R therein in such a manner that a front end portion of the roll paper R can be drawn out from a lower side of the roll toward the printer 6. A lower surface side of the opening/closing unit 16 is formed so as to cover an upper surface of the roll paper receptacle portion 10. That is, the opening/closing unit 16 functions also as a lid of the roll paper receptacle portion 10. At the time of accommodating the roll paper R in the roll paper receptacle portion 10, the opening/closing unit 16 is pivotally moved toward the rear side around the shaft 15, whereby the roll paper receptacle portion 10 is exposed to the front side (operator side).

The printer mechanics unit 11 includes a thermal head 17 disposed on the housing body portion 2a side and a platen 18, the platen 18 being mounted to the front end of the housing opening/closing portion 2b in the opening/closing unit 16 and under the first control board 12. With the opening/closing unit 16 closed, the platen 18 comes into pressure contact with the thermal head 17. The issue port 7 is formed between the housing body portion 2a and the housing opening/closing portion 2b. The printer mechanics unit 11 is provided with a cutter mechanism for cutting the roll paper R wholly or partially between the thermal head 17 and the issue port 7. In the printer 6 there is formed a paper path 19 extending from the roll paper receptacle portion 10 as a start point, then through the thermal head 17 and the cutter mechanism, and reaching the issue port 7.

To set the roll paper R in the printer 6, first the opening/closing unit 16 is opened, whereby the roll paper receptacle portion 10 and the paper path 19 are opened. In this state, the roll paper R is accommodated in the roll paper receptacle portion 10. Then, the front end of the roll paper R is drawn out up to the issue port 7 while allowing it to pass between the thermal head 17 and the platen 18. Next, the opening/closing unit 16 is closed. Loading of the roll paper R to the settlement terminal 1 is now over. Then, the platen 18 is rotated by a drive unit (not shown), whereby the roll paper R is conveyed along the paper path 19 while being gripped by the platen 18 and the thermal head 17. During this conveyance process, printing is performed for the roll paper R by the thermal head 17, then the roll paper R after the printing is cut by the cutter mechanism at a predetermined position and the thus-cut piece of the roll paper R is issued as a settlement slip from the issue port 7.

Figure 4:
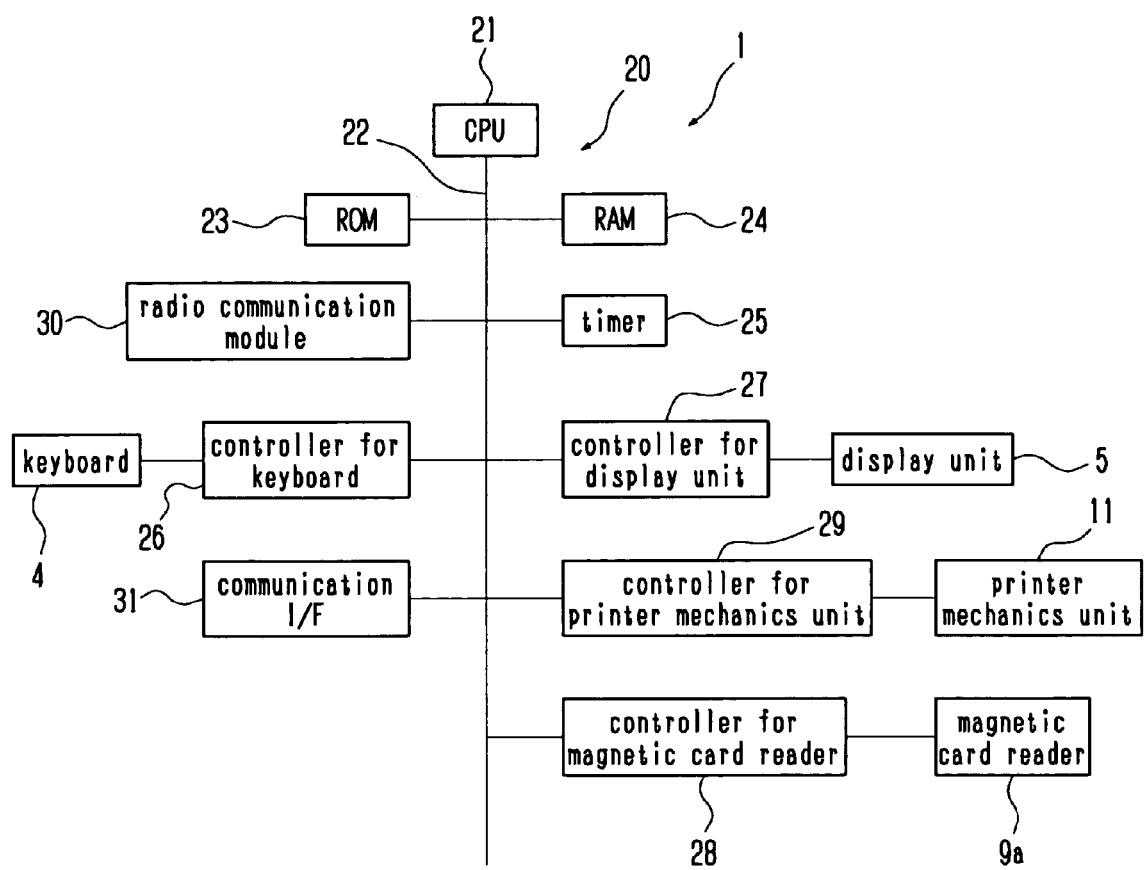
FIG. 4 is a block diagram showing electric connections of various components of the settlement terminal.

FIG. 4 is a block diagram showing electric connections of various components of the settlement terminal. With reference to FIG. 4, electric connections of various components of the settlement terminal 1 are described as follows. As shown in FIG. 4, the settlement terminal 1 includes a microcomputer 20, which controls the operation of the various components. In the microcomputer 20, a ROM (Read Only Memory) 23, which stores fixed data such as computer programs in advance, a RAM (Random Access Memory) 24, which functions as a work area for storing various data rewritably, and a timer 25 for counting date and time, are connected through a bus line 22 to a CPU (Central Processing Unit) 21, which centrally controls various components. Next, reference is made to various components of the settlement terminal 1 which are operated while being controlled by the microcomputer 20.

The keyboard 4, which has ten keys and execution keys, is connected to the bus line 22 through a controller 26 used for the keyboard 4 and inputs a signal corresponding to a depressed key to the microcomputer 20 through operation of the controller 26.

The display unit 5 is connected to the bus line 22 through a controller 27 used for the display unit 5. Upon input of display data from the microcomputer 20 to the controller 27, the display unit 5 is operated by the controller 27 to display predetermined matters.

The magnetic card reader 9a is connected to the bus line 22 through a controller 28 used for the magnetic card reader 9a, reads information stored in the magnetic stripe of the magnetic card and inputs the read information to the microcomputer 20 through operation of the controller 28.

The printer mechanics unit 11 is connected to the bus line 22 through a controller 29 used for the printer mechanics unit. Upon input of printing data from the microcomputer 20 to the controller 29, the printer mechanics unit 11 is operated by the controller 29 to print predetermined matters on the roll paper R, then cuts the roll paper R at a predetermined position and issues the cut piece of paper.

A radio communication module 30 having an antenna for the transmission and reception of radio wave and adapted to make communication of information with an external device by radio, and a communication interface 31 connected to an external device through a cable and adapted to make communication of information with the external device through the cable, are connected to the microcomputer 20 through the bus line 22. In the drawing, the interface is indicated at I/F. The radio communication module 30 and the communication interface 31 are connected to a settlement organ computer provided in a credit company or a bank through a public network as a communication line and a relay center such as CAFIS (Credit And Finance Information Switching System) and makes communication of information with the settlement organ computer.

The microcomputer 20 and the controller 27 used for the display unit 5, which are for the execution of high-speed bus processing, are mounted on the first control board 12 and constitute a first unit. The controller 26 used for the keyboard 4 and the controller 29 used for the printer mechanics unit 11, which are for the execution of low-speed bus processing, are mounted on the second control board 13 and constitute a second unit. In the bus processing performed by the microcomputer 20, the controller 27 for the display unit 5, the controller 26 for the keyboard 4 and the controller 29 for the printer mechanics unit 11, there is adopted a serial transmission method. The radio communication module 30 is mounted on the first control board 12 and constitutes the first unit.

Figure 5:
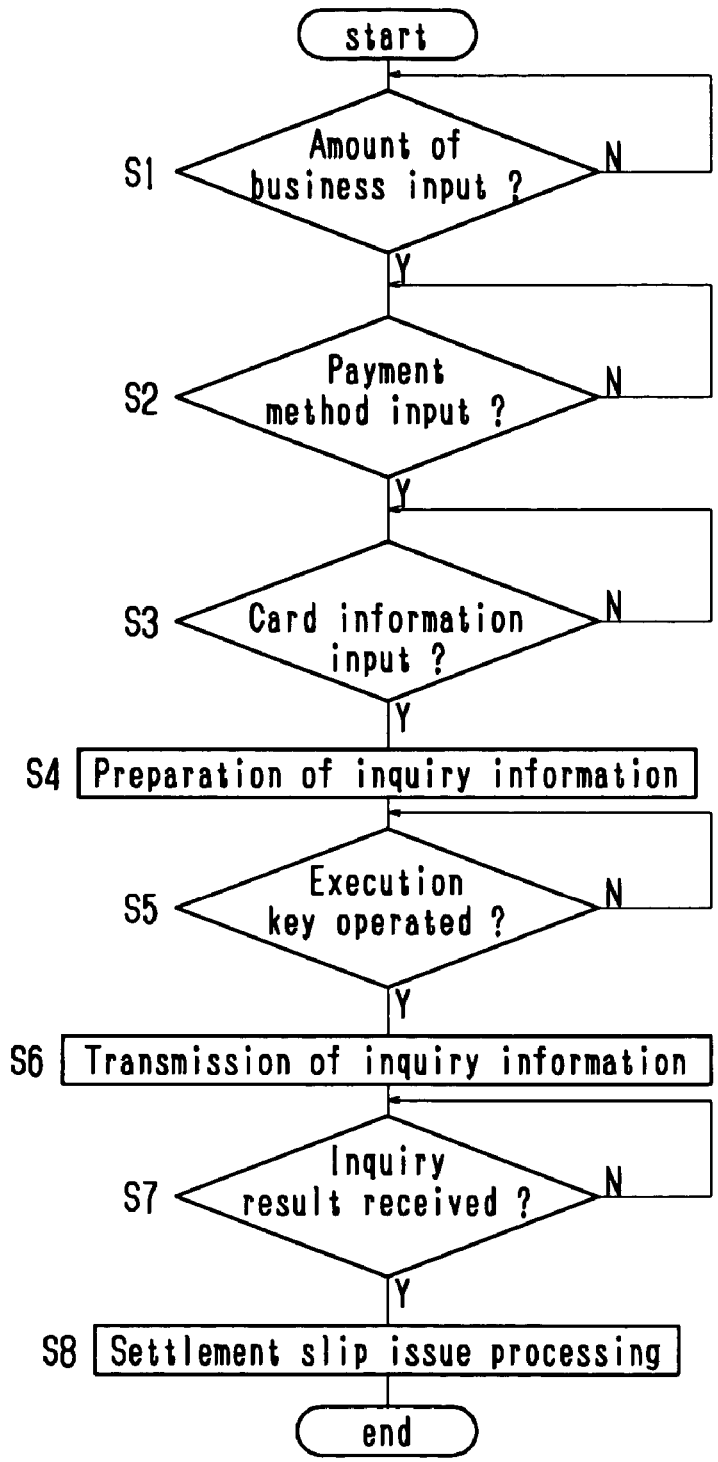
FIG. 5 is a flow chart showing the flow of settlement processing.

FIG. 5 is a flow chart showing the flow of settlement processing. The settlement processing that the CPU 21 executes in accordance with a computer program is described as follows based on the flow chart of FIG. 5. The settlement processing is processing that is carried out for the settlement of a transaction. When there are input of information on the amount of business by operator's operation of the keyboard 4 as a settlement operation (Y in step S1), subsequent input of a payment method (credit payment or debit payment) by operation of the keyboard 4 (Y in step S2), and further input of card information (e.g., credit card number and account number) that the magnetic card reader 9a has read from the magnetic stripe of a magnetic card upon scanning along the card reading groove 8 performed by the operator (Y in step S3), the inputted card information is acquired as settlement information and inquiry information is prepared (step S4). The inquiry information is prepared on the basis of the inputted amount of business and card information. In the case where the payment method is debit payment, a cash card password number inputted by the keyboard 4 or a pin pad or the like (not shown) connected to the settlement terminal 1 is also included in the inquiry information.

When an execution key on the keyboard 4 is operated by the operator for settlement (Y in step S5), the prepared inquiry information is transmitted to a settlement organ computer provided in each financial organ concerned (step S6), waiting for reception of inquiry result information provided from the settlement organ computer (N in step S7). Settlement operations to be performed for the settlement terminal 1 are now complete.

For the transmitted inquiry information, the settlement organ computer performs credit inquiry processing such as credit investigation and approval of the amount of money and then transmits inquiry result information to the settlement terminal 1. At this time, in the case of debit settlement, the amount of settlement is subtracted from the balance of the corresponding account upon approval of settlement.

Upon receipt of the inquiry result information from the settlement organ computer (Y in step S7), the settlement terminal 1, in accordance with the inquiry result information, executes a settlement slip issue processing involving controlling the operation of the printer mechanics unit 11, causing the printer mechanics unit to print the settlement information onto the roll paper R, cutting the roll paper R at a predetermined position, and issuing the thus cut, settlement information-printed roll paper as a settlement slip from the issue port 7 (step S8).

In the settlement terminal 1 of this embodiment, as described above, the keyboard 4 is disposed on the front side of the upper surface 3 of the housing 2, the display device 5 is disposed on the rear side of the upper surface 3, the printer mechanics unit 11 is disposed just under the keyboard 4, the control board 14 is disposed on the back side of the display unit 5, and the roll paper receptacle portion 10 is disposed just under the display unit 5 and the control board 14. Thus, various components installed within the housing 2 are positioned below both keyboard 4 and display unit 5, which are disposed on the upper surface 3 of the housing 2. As a result, the housing 2 is no longer required to extend backward for the mounting space of the roll paper receptacle portion 10. That is the device becomes smaller in size.

In this embodiment, since the card reading groove 8 for scanning a magnetic card is formed in the upper surface 3 of the housing 2 in adjacency to both keyboard 4 and display unit 5, the settlement terminal 1 need not be extended in the longitudinal direction for disposition of the magnetic card reader 9a and the card reading groove 8. Thus, the magnetic card reader 9a and the card reading groove 8 do not cause an increase in size of the settlement terminal 1.

In this embodiment, the upper surface 3 of the housing 2 is inclined toward the front side and the angle of the inclination is larger in the portion where the display unit 5 is disposed than in the portion where the card reading groove 8 is disposed. Consequently, it is easier for the operator who performs operation of the settlement terminal 1 on the front side of the same terminal to see the display unit 5 and to pull the magnetic card toward the front side at the time of scanning the magnetic card through the card reading groove 8.

In this embodiment, the display unit 5 and the control board 12 are pivotable about the shaft 15 as a fulcrum disposed on the rear side of the housing 2. Consequently, when roll paper R is to be inserted into or removed from the roll paper receptacle portion 10, the same receptacle portion can be exposed to the front side (operator side) by pivoting the opening/closing unit 16 toward the rear side. Thus, the workability for insertion and removal of the roll paper R with respect to the roll paper receptacle portion 10 is improved.

The settlement terminal 1 of this embodiment is further provided with an issue port 7 positioned between the keyboard 4 and a display unit 5, and a paper path 19. Through the paper path 19, a settlement slip which is drawn out from the roll paper R stored in the roll paper receptacle portion 10 and on which settlement information is printed is issued from the issue port 7. Therefore, if the opening/closing unit 16 having the display unit 5 and the control board 12 is opened, there expands a working space around the issue port 7, whereby the workability for insertion and removal of roll paper R with respect to the settlement terminal is improved.

According to the settlement processing in this embodiment, after the operation for settlement is completed by the microcomputer 20, the operation of the printer mechanics unit 11 is controlled to execute a settlement slip issue processing. Thus, the settlement slip is not issued during the settlement operation. That is, during the settlement operation, there is no fear that the display unit 5 may be obscured by the settlement slip or the keyboard 4 may become inoperable.

In this embodiment, moreover, the control board 14 is divided to the first control board 12 disposed on the back side of the display unit 5 and the second control board 13 disposed on the bottom in the housing 2. The first unit for executing high-speed bus processing is mounted on the first control board 12, while the second unit for executing low-speed bus processing is mounted on the second control board 13. Thus, since for example the microcomputer 20 and controller, which require high-speed bus processing, are mounted on the same control board 12, it is possible to ensure the required processing speed of bus processing conducted therebetween.

In this embodiment, the controller 26 for the keyboard 4 mounted on the control board 14, the controller 29 for the printer mechanics unit 11 mounted on the control board 14, and the controller 27 for the display unit 5 mounted on the control board 14, are provided. The first unit includes the microcomputer 20, and the controller 27 for the display unit 5. The second unit includes the controller 26 for the keyboard 4, and the controller 29 for the printer mechanics unit 11. Consequently, the controller 27 for the display unit 5, which executes high-speed bus processing, is disposed on the back side of the display unit 5, so that the distance between the controller 27 for the display unit 5 and the display unit 5 becomes shorter and it is possible to shorten the cable for connecting the two. As a result, it is possible to ensure the required speed of the bus processing that the controller 27 for the display device 5 executes. On the other hand, the controller 26 for the keyboard 4 and the controller 29 for the printer mechanics unit 11 are smaller in the amount of transmitted and received information than the controller 27 for the display unit 5, so even a long data transmitting/receiving path thereof poses no problem in terms of bus processing speed.

In this embodiment, the radio communication module 30 mounted on the control board 14 is provided and the first unit includes the radio communication module 30, whereby the antenna provided within the same module is positioned at the upper portion of the settlement terminal 1. Accordingly, the sensitivity in radio transmission and reception of the radio communication module 30 is improved and satisfactory information communication is carried out by the radio communication module 30.

Although reference has been made above to a magnetic card as an example card, the card may be an IC card. In this case, an IC card reader may be connected to the settlement terminal 1.

Obviously, numerous modifications and variations of the present invention are possible in light of the above-teachings. It is therefore to be understood that within the scope of the appended claims, the invention may be practiced otherwise than as specifically described herein.

What is claimed is:

1. A settlement terminal comprising:
    a housing;
    a keyboard disposed on a front side of an upper surface of the housing;
    a display unit disposed on a rear side of the upper surface of the housing;
    a printer mechanics unit disposed just under the keyboard in the interior of the housing;
    a control board with a microcomputer mounted thereon, the control board being disposed on a back side of the display unit in the interior of the housing;
    a roll paper receptacle portion disposed just under the display unit and the control board in the interior of the housing, the roll paper receptacle portion removably receiving therein roll paper to be fed to the printer mechanics unit;
    an issue port for discharge of the roll paper;
    a paper path that connects the roll paper receptacle portion and the issue port with each other so as to extend through the printer mechanics unit; and
    means for executing settlement processing on the basis of acquired settlement information and with use of the microcomputer.

2. The settlement terminal according to claim 1, further comprising:
    a card reading groove for scanning a magnetic card, the card reading groove being formed in the upper surface of the housing to be adjacent to the keyboard and the display unit; and
    a magnetic card reader disposed within the housing to read information from the magnetic card as scanned through the card reading groove,
    wherein the means for executing the settlement processing acquires as settlement information the information that the magnetic card reader has read from the magnetic card.

3. The settlement terminal according to claim 2, wherein the upper surface of the housing is inclined so as to be lower on the front side, and the angle of the inclination is set so as to be larger at the portion where the display unit is disposed than at the portion where the card reading groove is disposed.

4. The settlement terminal according to claim 1, wherein the display unit and the control board are pivotable about a fulcrum positioned on the rear side of the housing.

5. The settlement terminal according to claim 4, wherein the issue port is positioned between the keyboard and the display unit.

6. The settlement terminal according to claim 5, wherein the settlement processing includes processing that comprises, after the end of operation for settlement, controlling the operation of the printer mechanics unit to print settlement information to the roll paper and issue a settlement slip.

7. The settlement terminal according to claim 1, wherein the control board is divided into a first control board disposed on the back side of the display unit and a second control board disposed on a bottom of the housing in the interior of the housing,
    wherein the first control board carries thereon a first unit for executing high-speed bus processing, and
    wherein the second control board carries thereon a second unit for executing low-speed bus processing.

8. The settlement terminal according to claim 7, wherein the control board carries thereon a controller for the keyboard, a controller for the printer mechanics unit mounted on the control board, and a controller for the display unit mounted on the control board,
    wherein the first unit includes the microcomputer and the controller for the display unit, and
    wherein the second unit includes the controller for the keyboard and the controller for the printer mechanics unit.

9. The settlement terminal according to claim 7,
    wherein the control board carries a radio communication module thereon, and
    wherein the first unit includes the radio communication module.

* * * * *